(12) United States Patent
Awad Alla et al.

(10) Patent No.: US 11,577,674 B2
(45) Date of Patent: Feb. 14, 2023

(54) VEHICLE ELECTRICAL POWER SYSTEM

(71) Applicant: Ford Global Technologies, LLC, Dearborn, MI (US)

(72) Inventors: Michael Adel Awad Alla, Novi, MI (US); Sami Dagher, Dearborn, MI (US); Bo Wu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 16/924,313

(22) Filed: Jul. 9, 2020

(65) Prior Publication Data

US 2022/0009429 A1 Jan. 13, 2022

(51) Int. Cl.
| | | |
|---|---|---|
| *B60R 16/03* | (2006.01) | |
| *B60L 1/00* | (2006.01) | |
| *B60L 50/60* | (2019.01) | |
| *B60L 53/22* | (2019.01) | |
| *H02M 3/155* | (2006.01) | |

(52) U.S. Cl.
CPC ............ *B60R 16/03* (2013.01); *B60L 1/00* (2013.01); *B60L 50/60* (2019.02); *B60L 53/22* (2019.02); *H02M 3/155* (2013.01); *H02J 2207/20* (2020.01)

(58) Field of Classification Search
CPC ............ H02M 3/00; H02M 1/36; H02M 1/32; H02M 3/155; H02M 1/008; B60R 16/03; B60L 50/60; B60L 53/22; B60L 1/00; H02J 2207/20
See application file for complete search history.

(56) References Cited

U.S. PATENT DOCUMENTS

| | | |
|---|---|---|
| 10,391,886 B2 | 8/2019 | Wortberg et al. |
| 2010/0312430 A1* | 12/2010 | Troncoso ............... B60R 16/03 701/31.4 |
| 2019/0283609 A1* | 9/2019 | Symanow ............. B60L 3/0046 |
| 2019/0291712 A1* | 9/2019 | Symanow ............. B60W 10/06 |
| 2019/0312449 A1 | 10/2019 | Matsushita |

FOREIGN PATENT DOCUMENTS

| | | |
|---|---|---|
| WO | 2016012134 A1 | 1/2016 |
| WO | 2020007403 A1 | 1/2020 |

* cited by examiner

*Primary Examiner* — Jared Fureman
*Assistant Examiner* — Duc M Pham
(74) *Attorney, Agent, or Firm* — Frank A. MacKenzie; Bejin Bieneman PLC

(57) ABSTRACT

An electrical power system for a vehicle comprising a base powernet and a primary powernet electrically connected to primary safety critical loads. A switch is disposed between the base powernet and the primary powernet. The switch is configured to transition between a closed state that electrically connects the base powernet to the primary powernet and an open state that disconnects the base powernet from the primary powernet.

20 Claims, 3 Drawing Sheets

VEHICLE ELECTRICAL POWER SYSTEM

BACKGROUND

Vehicles generate power both to propel the vehicle and to supply various electrical loads in the vehicle. Types of power systems include a conventional powertrain including an internal-combustion engine coupled to a transmission that transfers rotational motion to wheels; an electric powertrain including batteries, an electric motor, and a transmission that transfers rotational motion to the wheels; and a hybrid powertrain including elements of the conventional powertrain and the electric powertrain.

In vehicles with conventional powertrains, an alternator transforms rotational kinetic energy from the engine into electrical energy for the electrical loads. In all-electric and hybrid-electric vehicles, a DC/DC converter may convert between high voltage electrical energy for propelling the vehicle and low-voltage energy for the electrical loads.

DETAILED DESCRIPTION

Figure 1:
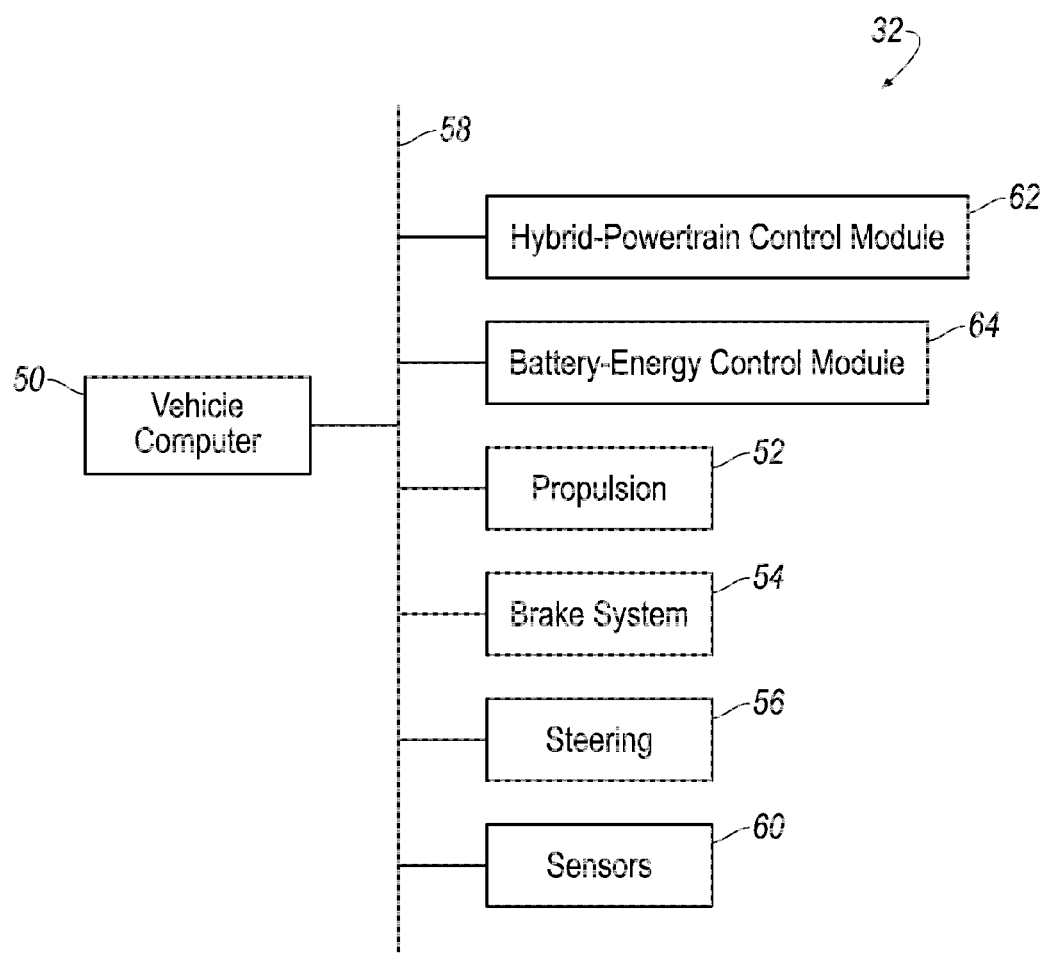
FIG. 1 is a block diagram of an example vehicle

An electrical power system for a vehicle includes a base powernet and a primary powernet electrically connected to primary safety critical loads. A switch is disposed between the base powernet and the primary powernet. The switch is configured to transition between a closed state that electrically connects the base powernet to the primary powernet and an open state that disconnects the base powernet from the primary powernet.

In other features, the primary safety critical loads include at least one of a braking system or steering.

In other features, the electrical power system includes a high voltage powernet that electrically connects an autonomous vehicle system to a high voltage battery.

In other features, the electrical power system includes a DC/DC converter that is disposed between the high voltage powernet and the primary powernet. The DC/DC converter converts a high voltage direct current from the high voltage battery to a low-voltage direct current for the primary powernet.

In other features, the electrical power system includes a secondary powernet electrically connected to secondary safety critical loads.

In other features, the electrical power system includes a DC/DC converter that is disposed between the high voltage powernet and the secondary powernet. The DC/DC converter converts a high voltage direct current from the high voltage battery to a low-voltage direct current for the secondary powernet.

In other features, the secondary safety critical loads include at least one of a backup braking system or backup steering.

In other features, the electrical power system includes a control module communicatively coupled to the switch, wherein the control module causes the switch to transition from the closed state to the open state when a voltage at the primary powernet is below a predetermined charge level.

In other features, the control module is programmed to instruct a vehicle computer to put the vehicle in a minimal risk condition in response to the voltage of the primary powernet being below the predetermined charge level.

In other features, putting the vehicle in the minimal risk condition includes driving the vehicle to a roadside.

In other features, putting the vehicle in the minimal risk condition includes initiating a handover to a human driver.

In other features, the switch includes at least one of a relay or a transistor.

A control module includes a processor and a memory storing processor-executable instructions. The processor is programmed to (1) instruct an autonomous-driving computer of a vehicle to put the vehicle in a minimal risk condition and (2) cause a switch to transition from a closed state to an open state in response to a signal indicating a voltage of a primary powernet is below a predetermined charge level. An electrical power system of the vehicle includes a base powernet and the primary powernet electrically connected to primary safety critical loads; The switch is disposed between the base powernet and the primary powernet, wherein the switch is configured to transition between the closed state that electrically connects the base powernet to the primary powernet and the open state that disconnects the base powernet from the primary powernet.

In other features, the primary safety critical loads include at least one of a braking system or steering.

In other features, the electrical power system further includes a high voltage powernet that electrically connects an autonomous vehicle system to a high voltage battery.

In other features, the electrical power system further includes a DC/DC converter disposed between the high voltage powernet and the primary powernet. The DC/DC converter converts a high voltage direct current from the high voltage battery to a low-voltage direct current for the primary powernet.

In other features, the electrical power system further includes a secondary powernet electrically connected to secondary safety critical loads.

In other features, the electrical power system further includes a DC/DC converter disposed between the high voltage powernet and the secondary powernet. The DC/DC converter converts a high voltage direct current from the high voltage battery to a low-voltage direct current for the secondary powernet.

In other features, the secondary safety critical loads include at least one of a backup braking system or backup steering.

In other features, putting the vehicle in the minimal risk condition includes at least one of driving the vehicle to a roadside or initiating a handover to a human driver.

In some vehicle configurations, vehicles can include up to three powernets that provide electrical power to one or more vehicle loads connected to the respective powernets. In some instances, due to excessive electrical loads that primary and secondary powernets are supporting, the time duration allowed to execute a fallback maneuver event is can be limited.

The present disclosure discloses an electrical power system that reduce the number of powernets within an autonomous vehicle. The electrical power system can include a switch positioned between the primary powernet of the autonomous vehicle and a base powernet of the autonomous vehicle as described in greater detail herein.

FIG. 1 illustrates an example vehicle 32 systems according to an example implementation. In various implementations, the vehicle 32 may be an autonomous vehicle. A vehicle computer 50 can be configured to operate the vehicle 32 independently of the intervention of a human driver, completely or to a lesser degree. The vehicle computer 50 may be programmed to operate a propulsion 52, a brake system 54, a steering 56, and/or other vehicle systems. For the purposes of this disclosure, autonomous operation means the vehicle computer 50 controls the propulsion 52, brake system 54, and steering 56 without input from a human driver, semi-autonomous operation means the vehicle computer 50 controls one or two of the propulsion 52, brake system 54, and steering 56 and a human driver controls the remainder; and nonautonomous operation means a human driver controls the propulsion 52, brake system 54, and steering 56.

The vehicle computer 50 may be a microprocessor-based computer. The vehicle computer 50 includes a processor, memory, etc. The memory of the vehicle computer 50 includes memory for storing instructions executable by the processor as well as for electronically storing data and/or databases.

The vehicle computer 50 may transmit and receive data through a communications network 58 such as a controller area network (CAN) bus, Ethernet, WiFi, Local Interconnect Network (LIN), onboard diagnostics connector (OBD-II), and/or by any other wired or wireless communications network. The vehicle computer 50 may be communicatively coupled to the propulsion 52, the brake system 54, the steering 56, sensors 60, a hybrid-powertrain control module 62, a battery-energy control module 64, and other components via the communications network 58.

Figure 2:
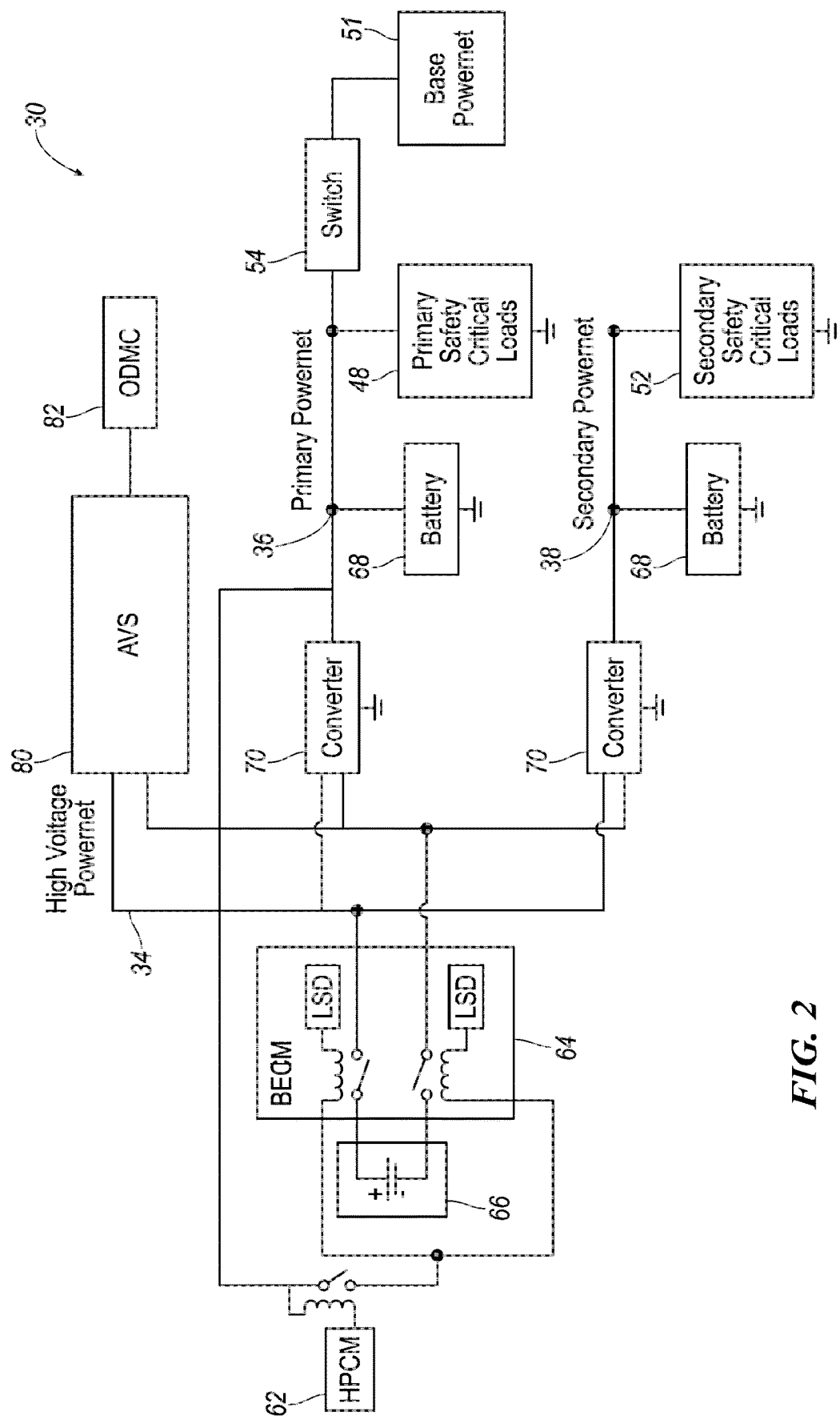
FIG. 2 is a circuit diagram of an example electrical power system for the vehicle of FIG. 1.

The propulsion 52 of the vehicle 32 generates energy and can translate the energy into motion of the vehicle 32. The propulsion 52 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain (as shown in FIG. 2); or any other type of propulsion. If hybrid, the propulsion 52 may include a powertrain arranged in any hybrid manner. e.g., a series-hybrid powertrain, a parallel-hybrid powertrain, a power-split (series-parallel) hybrid powertrain, etc. The propulsion 52 can include an electronic control unit (ECU) or the like, such as the hybrid-powertrain control module 62, that is in communication with and receives input from the vehicle computer 50 and/or a human driver. The human driver may control the propulsion 52 via, e.g., an accelerator pedal and/or a gear-shift lever.

The brake system 54 is typically a known vehicle braking subsystem and can resist the motion of the vehicle 32 to thereby slow and/or stop the vehicle 32. The brake system 54 may include friction brakes such as disc brakes, drum brakes, band brakes, etc.; regenerative brakes; any other suitable type of brakes; or a combination. The brake system 54 can include an electronic control unit (ECU) or the like that is in communication with and receives input from the vehicle computer 50 and/or a human driver. The human driver may control the brake system 54 via, e.g., a brake pedal.

The steering 56 is typically a known vehicle steering subsystem and controls the turning of the wheels. The steering 56 may be a rack-and-pinion system with electric power-assisted steering, a steer-by-wire system, such as are both known, or any other suitable system. The steering 56 can include an electronic control unit (ECU) or the like that is in communication with and receives input from the vehicle computer 50 and/or a human driver. The human driver may control the steering 56 via, e.g., a steering wheel.

The sensors 60 may provide data about operation of the vehicle 32, for example, wheel speed, wheel orientation, and engine and transmission data (e.g., temperature, fuel consumption, etc.). The sensors 60 may detect the location and/or orientation of the vehicle 32. For example, the sensors 60 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 60 may detect the external world, e.g., objects and/or characteristics of surroundings of the vehicle 32, such as other vehicles, road lane markings, traffic lights and/or signs, pedestrians, etc. For example, the sensors 60 may include radar sensors, scanning laser range finders, light detection and ranging (LIDAR) devices, and image processing sensors such as cameras. The sensors 60 may include communications devices, for example, vehicle-to-infrastructure (V2I) or vehicle-to-vehicle (V2V) devices.

FIG. 2 illustrates an example electrical power system 30 for the vehicle 32. As shown, the electrical power system 30 includes a high voltage powernet 34, a primary powernet 36, a secondary powernet 38, and a base powernet 51. Each powernet 34, 36, 38, 51 is configured to provide electrical power to the various sensors 60 within the vehicle 32. The electrical power system 30 provides high reliability. The electrical power system 30 may qualify for an ASIL B rating, a rating on the Automotive Safety Integrity Level scale defined by ISO 26262, propagated by the International Organization for Standardization.

With reference to FIG. 2, the hybrid-powertrain control module (HPCM) 62 is a microprocessor-based controller. The hybrid-powertrain control module 62 may include a processor, memory, etc. The memory of the hybrid-powertrain control module 62 may include memory for storing instructions executable by the processor as well as for electronically storing data and/or databases. The hybrid-powertrain control module 62 may be in communication with and may control components of the propulsion 52 such as an engine, transmission, etc. (not shown), among other functions.

In an example implementation, the battery-energy control module (BECM) 64 is a microprocessor-based controller. The battery-energy control module 64 may include a processor, memory, etc. The memory of the battery-energy control module 64 may include memory for storing instructions executable by the processor as well as for electronically storing data and/or databases. In this implementation, the battery-energy control module 64 may be in communication with and may monitor and control a high voltage battery 66, one or more vehicle batteries 68, etc., among other operations. It is understood that the present disclosure illustrates an example implementation of the battery-energy control module 64. As such, the battery-energy control module 64 may be implemented in other configurations as well. For example, in some implementations, the battery-energy control module 64 is configured to manage only the high voltage battery 66. In this example, the vehicle 32 may include a Low Voltage Power Management System (LVPMS) that coordinates (e.g., manages and controls) powernets 36, 38 described below.

The high voltage battery 66 may have a voltage on the order of 250 volts. The high voltage battery 66 may be any type suitable for providing high voltage electricity for operating the vehicle 32, e.g., lithium-ion, lead-acid, etc. The high voltage battery 66 may be electrically connected to the hybrid-powertrain control module 62 and to DC/DC converters 70 via the battery-energy control module 64.

The DC/DC converters 70 may convert between high voltage direct current from the high voltage battery 66 and low-voltage direct current flowing along a primary powernet 36 and a secondary powernet 38. The low-voltage direct current may be, e.g., 12 volts or 48 volts.

The powernets 36, 38, which comprise nodes within the electrical power system 30, each electrically connect one of the DC/DC converters 70, one of the vehicle batteries 68, and a plurality of loads 48, 52. The purposes of this disclosure, a node is defined as a point on a circuit where components of the circuit meet.

The vehicle batteries 68 are electrically connected to the respective powernets 36, 38. The vehicle batteries 68 may be low-voltage batteries, e.g., 12 volts or 48 volts. The vehicle batteries 68 may be any suitable type of battery for providing electricity to the loads 48, e.g., lithium-ion, lead-acid, etc. In some implementations, a battery-monitoring system may be connected to each of the vehicle batteries 68. The battery-monitoring systems may transmit the states of charge of the vehicle batteries 68 to, e.g., the battery-energy control module 64. The loads 48, 51, 52 are components of the vehicle 32 that draw electrical power to operate.

As shown, the electrical power system 30 includes autonomous vehicle system (AVS) 80 and an object detection maintenance control (ODMC) system 82, which are connected to the high voltage battery 66 via the high voltage powernet 34. The AVS 80 and the ODMC system 82 may include respective ECUs that operate the respective systems. The AVS 80 may include devices that perform object detection, object classification, and/or route planning for the vehicle 32. The ODMC 82 system may include components that determine whether any devices of the AVS are obfuscated, e.g., debris or water on a camera lens, and initiate actions to remove the obfuscating object. For instance, the ODMS 82 may initiate a wiper or initiate air pressure to remove the obfuscating object from the AVS 80 device.

By powering the AVS 80 and the ODMC system 82 via the high voltage powernet 34, the number of loads powered by the primary powernet 36 and the secondary powernet 38 are reduced. In an example implementation, the loads can be reduced by up to about four (4) kilowatts. As shown, the primary safety critical loads 48 are powered via the primary powernet 36. The primary safety critical loads 48 may include, but are not limited to, the brake system 54 and the steering 56.

The primary powernet 36 can also selectively provide power to the base powernet 50. For example, as shown in FIG. 2, one or more switches 54 are positioned between the primary powernet 36 and the base powernet 51. The one or more switches 54 may be operated by the vehicle computer 50, the hybrid-powertrain control module 62, and/or the battery-energy control module 64. The one or more switches 54 are configured switch between an open state. e.g., open circuit, and a closed state, e.g., closed circuit. When the one or more switches 54 are in the open state, the one or more switches 54 at least substantially prevent the flow of current between the primary powernet 36 and the base powernet 51. When the one or more switches 54 are in the closed state, the one or more switches allow the flow of current between the primary powernet 36 and the base powernet 51 such that the primary powernet 36 can power the base powernet 51 devices.

During vehicle 32 operation, the one or more switches 54 may initially be in a closed state such that the base powernet 51 is electrically connected to the primary powernet 36. In instances where the hybrid-powertrain control module 62 or the battery-energy control module 64 determines that a vehicle power event is or has occurred, the hybrid-powertrain control module 62 or the battery-energy control module 64 may cause the switches 54 to transition from the closed state to the open state to conserve power distribution within the electrical power system 30. The vehicle power event may comprise, but is not limited to, the hybrid-powertrain control module 62 or the battery-energy control module 64 receiving signals indicating that one or more batteries within the vehicle 32 are below a predetermined charge level, e.g., a state of charge. For instance, the vehicle computer 50 may determine that the electrical power system 30 is experiencing a failure based on one or more signals indicating an electrical charge within the electrical power system 30 is below the predetermined charge level.

The predetermined charge level may correspond to a state in which one or more batteries within the vehicle 32 puts the vehicle 32 in a minimal risk condition. For purposes of this disclosure, that term has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016:September2016)).) For example, the minimal risk condition may be initiating a handover to the human driver or autonomously driving the vehicle 32 to a halt at a roadside, i.e., stopping the vehicle 32 outside active lanes of traffic.

By transitioning the switches 54 to the open state, the base powernet 51 is no longer powered by the primary powernet 36 such that the primary safety critical loads 48 can be used for one or more fallback maneuvers. A fallback maneuver can be defined as the vehicle computer 50 transmitting a signal to the propulsion 52 to reduce the speed of the vehicle 32, transmitting a signal to the brake system 54 to actuate the brakes, and/or transmitting a signal to the steering 56 to alter a course of the vehicle 32.

The base powernet 51 provides to one or more devices within the vehicle 32. For example, the base powernet 51 can provide power to the base vehicle modules, such as engine control modules, body control modules, or the like. The secondary safety critical loads 52 may include, but are not necessarily limited to, a secondary brake system, e.g., a backup brake system, a secondary steering, e.g., a backup steering, or the like.

The one or more switches 54 may comprise any suitable electrical component that can disconnect or connect a conducting path between the primary powernet 36 and the base powernet 51. For example, the one or more switches 54 may comprise a relay, such as a solid-state relay (SSR), a transistor, such as a metal-oxide-semiconductor field-effect transistor (MOSFET), or the like.

Figure 3:
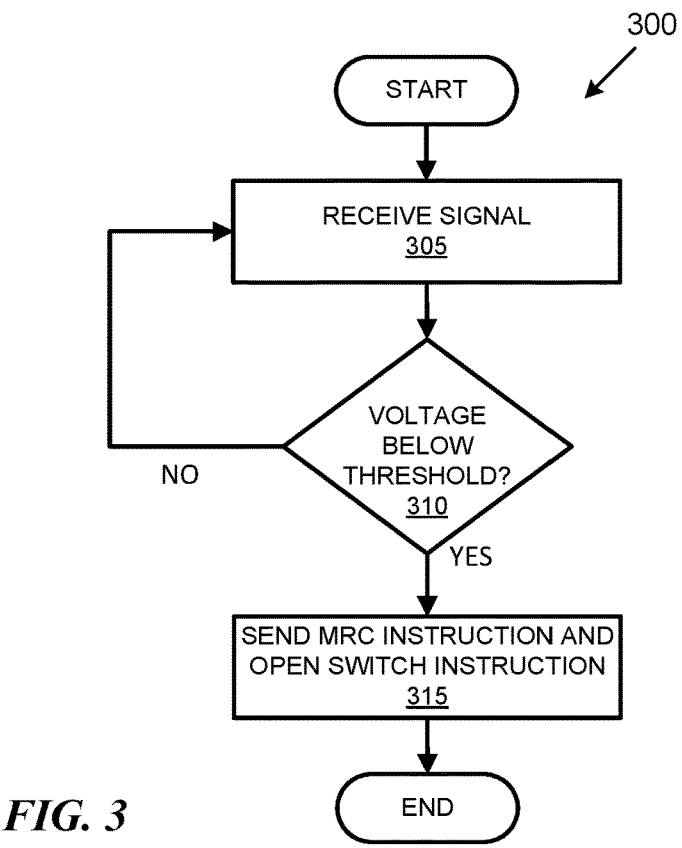
FIG. 3 is a flow diagram of an example process for responding to a vehicle power event within the electrical power system of FIG. 2.

FIG. 3 is a process flow diagram illustrating an exemplary process 300 for responding to a failure of the electrical power system 30. The memory of, e.g., the hybrid-powertrain control module 62 or the battery-energy control module 64 stores executable instructions for performing the steps of the process 300. In general, one of the control modules 62, 64 instructs the vehicle computer 50 to put the vehicle 32 in a minimal risk condition.

The process 300 begins in a block 305, in which the one of the control modules 62, 64 receives a signal indicative of an electrical charge within the electrical power system 30. For example, the signal may be provided by one or more batteries 68. Next, in a decision block 310, the one of the control modules 62, 64 determines whether a voltage $V_{batt}$ of the primary powernet 36 is below the predetermined charge level. If the voltage $V_{batt}$ is above the predetermined charge level, the process 300 returns to the block 305 to continue monitoring the voltage $V_{batt}$.

If the voltage $V_{batt}$ is below the predetermined charge level, next, in a block 315, the one of the control modules 62, 64 instructs the vehicle computer 50 to put the vehicle 32 in a minimal risk condition and causes the one or more switches 54 to transition from the closed state to the open state to disconnect the electrical path between the primary powernet 36 and the base powernet 51. After the block 315, the process 400 ends.

Figure 4:
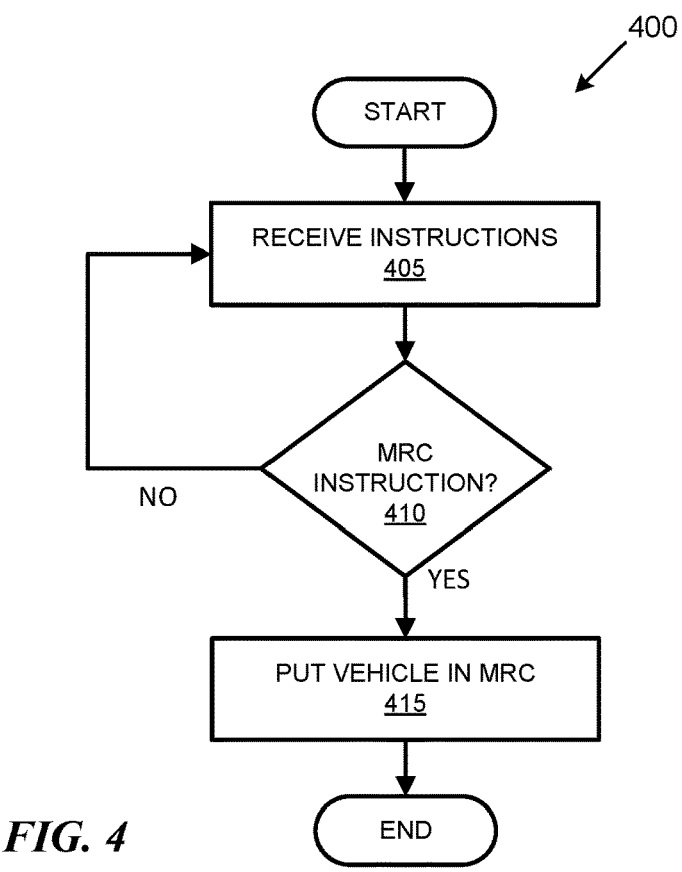
FIG. 4 is a flow diagram of an example process for putting the vehicle of FIG. 1 in a minimal risk condition.

FIG. 4 is a process flow diagram illustrating an exemplary process 400 for putting the vehicle 32 in a minimal risk condition. The memory of the vehicle computer 50 stores executable instructions for performing the steps of the process 500. In general, the vehicle computer 50 puts the vehicle 32 in a minimal risk condition in response to an instruction from another vehicle subsystem, such as from the hybrid-powertrain control module 62 or the battery-energy control module 64, that the vehicle computer 50 do so.

The process 400 begins in a block 405, in which the vehicle computer 50 receives an instruction from one of the vehicle subsystems, such as from the hybrid-powertrain control module 62 or the battery-energy control module 64 as described with respect to the block 315 above.

Next, in a decision block 410, the vehicle computer 50 determines whether the instruction is to put the vehicle 32 in a minimal risk condition by reading the instruction. If the instruction is to perform some action other than putting the vehicle 32 in a minimal risk condition, the process 400 returns to the block 405 to continue receiving instructions.

If the instruction is to put the vehicle 32 in a minimal risk condition, next, in a block 415, the vehicle computer 50 puts the vehicle 32 in a minimal risk condition. According to the National Highway Traffic Safety Administration (NHTSA) and the Society of Automotive Engineers (SAE), "'Minimal risk condition' means low-risk operating condition that an automated driving system automatically resorts to either when a system fails or when the human driver fails to respond appropriately to a request to take over the dynamic driving task." For example, the minimal risk condition may be initiating a handover to the human driver or autonomously driving the vehicle 32 to a roadside, i.e., stopping the vehicle 32 outside active lanes of traffic. The vehicle computer 50 may store programming for only one type of minimal risk condition, or the type of minimal risk condition may be selected based on. e.g., driving context, e.g., handing operation of the vehicle 32 over to a human driver on low-speed surface streets and autonomously driving the vehicle 32 to a roadside on freeways. The vehicle computer 50 may perform the minimal risk condition, e.g., navigate to a stop on a road shoulder, by using known autonomous-operation algorithms to control the propulsion 52, the brake system 54, and the steering 56. After the block 415, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores. Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google. Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions. e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. An electrical power system for a vehicle comprising:
    a base powernet;
    a primary powernet electrically connected to primary safety critical loads; and
    a switch disposed between the base powernet and the primary powernet, wherein the switch is configured to transition between a closed state that electrically connects the base powernet to the primary powernet and an open state that disconnects the base powernet from the primary powernet;
    wherein the base powernet is powered by the primary powernet when the switch is in the closed state; and
    the base powernet is unpowered when the switch is in the open state.

2. The electrical power system of claim 1, wherein the primary safety critical loads comprise at least one of a braking system or steering.

3. The electrical power system of claim 1, further comprising a high voltage powernet that electrically connects an autonomous vehicle system to a high voltage battery.

4. The electrical power system of claim 3, further comprising a DC/DC converter that is disposed between the high voltage powernet and the primary powernet, wherein the DC/DC converter converts a high voltage direct current from the high voltage battery to a low-voltage direct current for the primary powernet.

5. The electrical power system of claim 3, further comprising a secondary powernet electrically connected to secondary safety critical loads.

6. The electrical power system of claim 5, further comprising a DC/DC converter that is disposed between the high voltage powernet and the secondary powernet, wherein the DC/DC converter converts a high voltage direct current from the high voltage battery to a low-voltage direct current for the secondary powernet.

7. The electrical power system of claim 5, wherein the secondary safety critical loads comprise at least one of a backup braking system or backup steering.

8. The electrical power system of claim 1, further comprising a control module communicatively coupled to the switch, wherein the control module causes the switch to transition from the closed state to the open state when a voltage at the primary powernet is below a predetermined charge level.

9. The electrical power system of claim 8, wherein the control module is programmed to instruct a vehicle computer to put the vehicle in a minimal risk condition in response to the voltage of the primary powernet being below the predetermined charge level.

10. The electrical power system of claim 9, wherein putting the vehicle in the minimal risk condition comprises driving the vehicle to a roadside.

11. The electrical power system of claim 9, wherein putting the vehicle in the minimal risk condition comprises initiating a handover to a human driver.

12. The electrical power system of claim 1, wherein the switch comprises at least one of a relay or a transistor.

13. A control module comprising a processor and a memory storing processor-executable instructions, the processor programmed to:
    (1) instruct an autonomous-driving computer of a vehicle to put the vehicle in a minimal risk condition and (2) cause a switch to transition from a closed state to an open state in response to a signal indicating a voltage of a primary powernet is below a predetermined charge level;

wherein an electrical power system of the vehicle includes:
a base powernet;
the primary powernet electrically connected to primary safety critical loads; and
the switch disposed between the base powernet and the primary powernet, wherein the switch is configured to transition between the closed state that electrically connects the base powernet to the primary powernet and the open state that disconnects the base powernet from the primary powernet, the base powernet is powered by the primary powernet when the switch is in the closed state, and the base powernet is unpowered when the switch is in the open state.

14. The control module of claim 13, wherein the primary safety critical loads comprise at least one of a braking system or steering.

15. The control module of claim 13, wherein the electrical power system further comprises a high voltage powernet that electrically connects an autonomous vehicle system to a high voltage battery.

16. The control module of claim 15, wherein the electrical power system further comprises a DC/DC converter disposed between the high voltage powernet and the primary powernet, wherein the DC/DC converter converts a high voltage direct current from the high voltage battery to a low-voltage direct current for the primary powernet.

17. The control module of claim 15 wherein the electrical power system further comprises a secondary powernet electrically connected to secondary safety critical loads.

18. The control module of claim 17, wherein the electrical power system further comprises a DC/DC converter disposed between the high voltage powernet and the secondary powernet, wherein the DC/DC converter converts a high voltage direct current from the high voltage battery to a low-voltage direct current for the secondary powernet.

19. The control module of claim 17, wherein the secondary safety critical loads comprise at least one of a backup braking system or backup steering.

20. The control module of claim 13, wherein putting the vehicle in the minimal risk condition comprises at least one of driving the vehicle to a roadside or initiating a handover to a human driver.

* * * * *